(12) United States Patent
Zhang et al.

(10) Patent No.: US 10,129,939 B1
(45) Date of Patent: Nov. 13, 2018

(54) HIGH EFFICIENCY FLICKER ATTENUATOR FOR LIGHTING

(71) Applicant: DIALOG SEMICONDUCTOR INC., Campbell, CA (US)

(72) Inventors: Chenglong Zhang, Campbell, CA (US); Nan Shi, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/645,845

(22) Filed: Jul. 10, 2017

(51) Int. Cl.
  *H05B 33/08* (2006.01)
  *H05B 37/02* (2006.01)

(52) U.S. Cl.
  CPC ....... *H05B 33/0812* (2013.01); *H05B 33/089* (2013.01); *H05B 33/0815* (2013.01)

(58) Field of Classification Search
  CPC   H05B 33/08; H05B 33/0812; H05B 33/0815; H05B 33/089; H05B 33/0851; H05B 39/00; H05B 39/02; H05B 39/04; H05B 39/041; H05B 37/02
  See application file for complete search history.

(56) References Cited

U.S. PATENT DOCUMENTS

| | | | | |
|---|---|---|---|---|
| 9,006,992 B2 * | 4/2015 | Sadwick | ............... | H03K 17/72 315/224 |
| 9,148,916 B2 * | 9/2015 | Chang | ............... | H05B 33/0812 |
| 2007/0182347 A1 * | 8/2007 | Shteynberg | ........ | H05B 33/0815 315/312 |
| 2008/0258641 A1 * | 10/2008 | Nakagawa | ......... | H05B 33/0818 315/246 |
| 2011/0156605 A1 * | 6/2011 | Ku | .................... | H05B 33/0818 315/186 |
| 2012/0104970 A1 * | 5/2012 | Okubo | ............... | H05B 33/0887 315/291 |
| 2014/0320031 A1 * | 10/2014 | Wu | .................... | H05B 33/0812 315/193 |

(Continued)

FOREIGN PATENT DOCUMENTS

| | | |
|---|---|---|
| DE | 102015200320 | 7/2015 |
| DE | 112015004202 | 6/2017 |

OTHER PUBLICATIONS

German Office Action dated Jul. 25, 2018 from corresponding German Application No. 102017221729.4.

*Primary Examiner* — Thai Pham
(74) *Attorney, Agent, or Firm* — Haynes and Boone, LLP

(57) ABSTRACT

Systems, devices, and methods for dimming of solid state lighting reduce ripple and flicker at low load dimming levels (low LED current, lower light levels) yet provide full power to the load at high load dimming levels (high LED current, higher light levels) thereby reducing power loss compared to conventional dimming techniques. When dimming to lower light levels a flicker resisting metal oxide semiconductor field effect transistor (MOSFET) connected to the LED operates in linear mode such that the relationship of its drain-source voltage to the LED current is resistive to provide flicker reduction. Conversely, at higher light levels the flicker resisting MOSFET is operated in saturation mode such that full power is supplied to the LED as flicker reduction is less needed. The disclosed techniques also reduce undershoot and overshoot of the LED voltage during transitions in dimming control from high to low and low to high respectively.

15 Claims, 5 Drawing Sheets

(56) References Cited

U.S. PATENT DOCUMENTS

| | | | |
|---|---|---|---|
| 2015/0312983 A1* | 10/2015 | Hu .................. | F21K 9/1355 |
| | | | 315/186 |
| 2015/0382420 A1* | 12/2015 | Sakai ................ | H05B 33/0803 |
| | | | 315/193 |
| 2016/0285366 A1* | 9/2016 | Lee .................. | H05B 33/0815 |

* cited by examiner

HIGH EFFICIENCY FLICKER ATTENUATOR FOR LIGHTING

TECHNICAL FIELD

This application relates to solid state lighting and, more particularly, to dimmers for light emitting diode (LED) lighting.

BACKGROUND

Phase-cut dimmers are widely used for dimming incandescent types of lighting. When applied to solid state lighting, however, the results of using phase-cut dimmers are often unsatisfactory. When used with light emitting diode (LED) lighting the dimmer can produce a perceptible and annoying flicker or shimmering of the light level. Such variations in light intensity (collectively referred to as flicker) are usually more noticeable when the light is dimmed to lower levels and are generally less noticeable or even imperceptible at high or undimmed light levels.

A solid state LED lighting device typically includes an LED driver that converts AC power to regulated current to drive the LED loads. In drivers whose switching is based on the AC line voltage, the average LED current may not be consistent from cycle to cycle due to dimmer phase jitter. The variation of load current causes visible shimmer, particularly when dimming to low light. The load current variation resulting from phase jitter can come from many sources, such as AC line transient voltages or currents, phase-cut dimmer instability, or control variation. The amount of jitter is usually small enough as a percentage of the total power to not attract attention with little to no dimming at brighter light levels. But with dimming to low light levels, the percentage of current change due to the variation is higher and the resulting flicker or shimmer is more perceptible. In addition, the flicker can be random in amount or intensity or occur at certain times or randomly due to the unpredictable nature of the source of the variation. The variation and resultant shimmer can be more perceptible and irritating at lower frequencies such as about 4 Hz to 8 Hz. Another example that occurs with phase cut dimming is that at low light dimming levels the LED current will be small and tend to follow the AC line levels at 60 or 120 Hz so that the low frequency jitter on the AC line will cause a visible flicker or shimmer.

A common way to reduce flicker and shimmer is to add a ripple reduction circuit, e.g., using either discrete components or an integrated circuit. The purpose of such a discrete or integrated circuit, however, is to reduce ripple (50-120 Hz) at the input power supply, not shimmer and flicker (4-8 Hz) at the load. Such a circuit filters out not only the low light shimmer and flicker but also the normal output current ripple at higher loads. As described above, however, the flicker reduction function is not needed with little to no dimming at brighter light levels at higher loads, because when the output current is large, the impact of the low frequency variation is much less than when the output current is low. This application of ripple reduction circuits to reduce flicker and shimmer at low load levels as well as high load levels is wasteful of energy compared to using a circuit that more specifically suppresses shimmer and flicker at low load levels.

Accordingly, there is a need in the art for high efficiency flicker attenuators for solid state LED lighting.

SUMMARY

To address the need in the art for high efficiency flicker attenuators for solid state LED lighting, systems and methods are provided for flicker reduction that operate to reduce ripple and flicker at low load dimming levels (low LED current, lower light levels) and yet allow all the available current to directly pass to the LED load at full load power level. The disclosed embodiments provide ripple and flicker reduction when dimming to lower light levels (low LED current, low load) and directly power the LED at higher light levels (high LED current, high load). When dimming to lower light levels a flicker resisting metal oxide semiconductor field effect transistor (MOSFET) in series with the LED is operated in linear mode such that the relationship of its drain-source voltage to the LED current is resistive to provide flicker reduction. Conversely when dimming is adjusted to higher light levels the flicker resisting MOSFET is operated in saturation mode such that full power is supplied to the LED as flicker reduction is no longer needed. Power loss at full load is reduced compared to conventional dimmers that maintain flicker reduction at full load. In the disclosed embodiments, the operation of the flicker resisting MOSFET between linear and saturation modes according to the dimming level reduces undershoot and overshoot of the voltage applied to the LED during transitions in dimming control from high to low and low to high respectively.

These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems, devices, and methods are provided for solid state lighting dimming control that reduce ripple and flicker at low load dimming levels (low LED current, lower light levels) and yet provide full power to the load at high load dimming levels (high LED current, higher light levels). The disclosed embodiments provide ripple and flicker reduction when dimming to lower light levels (low LED current, low load) and directly power the LED at higher light levels (high LED current, high load). When dimming to lower light levels a metal oxide semiconductor field effect transistor (MOSFET) connected to the LED is operated in linear mode such that the relationship of its drain-source voltage to the LED current is resistive to provide flicker reduction. Conversely when dimming is adjusted to higher light levels the flicker resisting MOSFET is operated in saturation mode such that full power (maximum available current) is supplied to the LED when flicker reduction is less needed. Power loss at full load is reduced compared to conventional dimmers that maintain flicker reduction at full load. In the disclosed embodiments, the operation of the flicker resisting MOSFET between linear and saturation modes according to the dimming level reduces undershoot and overshoot of the voltage applied to the LED during transitions in dimming control from high to low and low to high respectively. Because less power is wasted the flicker reduction circuitry can be made smaller and cheaper so that it becomes practical for embodiments to be fitted in the base of a standard size bulb without undue heating of the socket.

Figure 1:
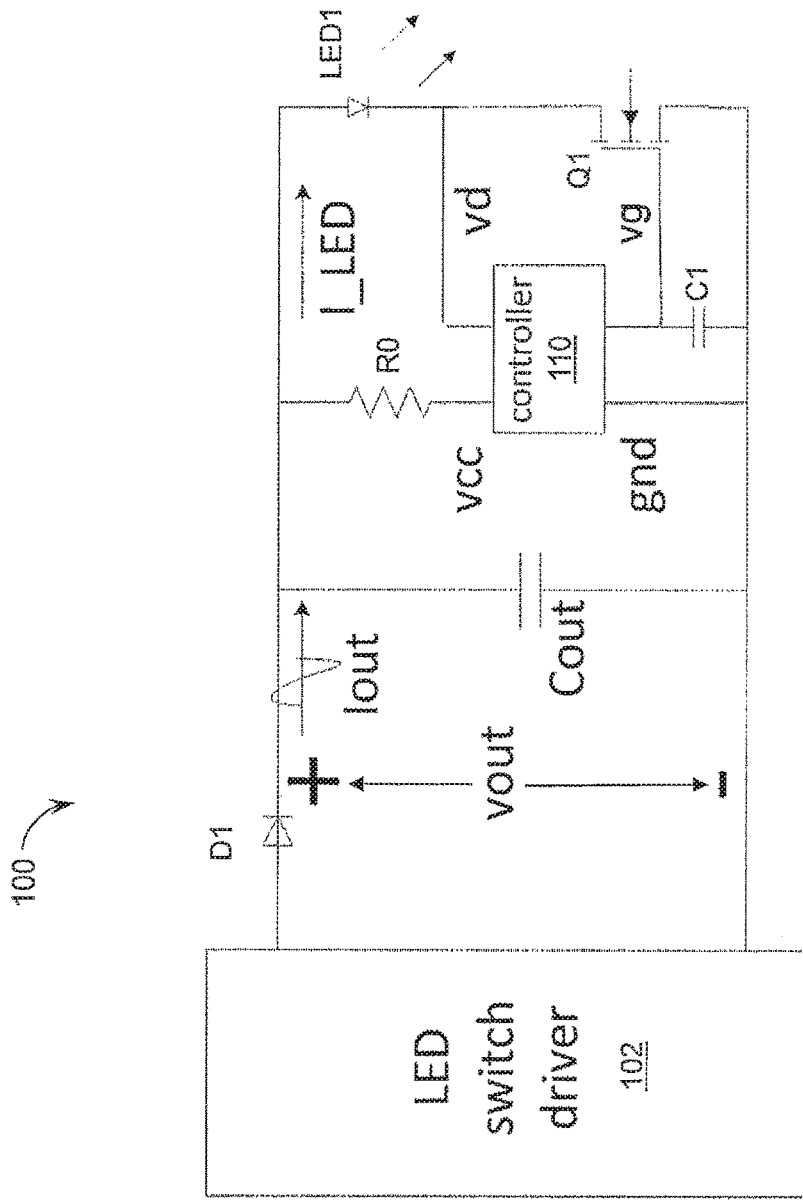
FIG. 1 is a circuit diagram of a system for high efficiency flicker attenuation for LED lighting in accordance with an aspect of the disclosure.

An example system 100 for high efficiency flicker attenuation for LED lighting is shown in FIG. 1. In various embodiments, system 100 may include an LED switch driver 102 that supplies power to system 100 from its own alternating current (AC) input such as a phase cut dimmer connected to a 120 Volt (V) AC mains. Thus, LED switch driver 102 may be a switched mode flyback converter, boost converter, buck converter, or buck-boost converter, for example. LED switch driver 102 supplies an output voltage Vout. Output current Iout is passed through a diode D1 to provide a direct current I_LED to a light emitting diode LED1. The average level of the direct current I_LED may be controlled by a user via user input to a dimmer control that uses phase-cut dimming, e.g., either leading edge phase-cut dimming or trailing edge phase-cut dimming, to provide power to LED switch driver 102.

An output capacitor Cout provides filtering of the output current Iout to smooth the current I_LED driving light emitting diode LED1. In that regard, Cout and the effective series resistance of LED1 and a flicker resisting transistor Q1 (the flicker resisting MOSFET) form a low pass RC filter whose time constant can vary depending on the effective resistance of Q1. The effective resistance or impedance of Q1 can be varied depending on its mode of operation as further described below. The mode of operation can be adjusted by a controller 110 by varying the gate voltage vg for flicker resisting transistor Q1.

Figure 2:
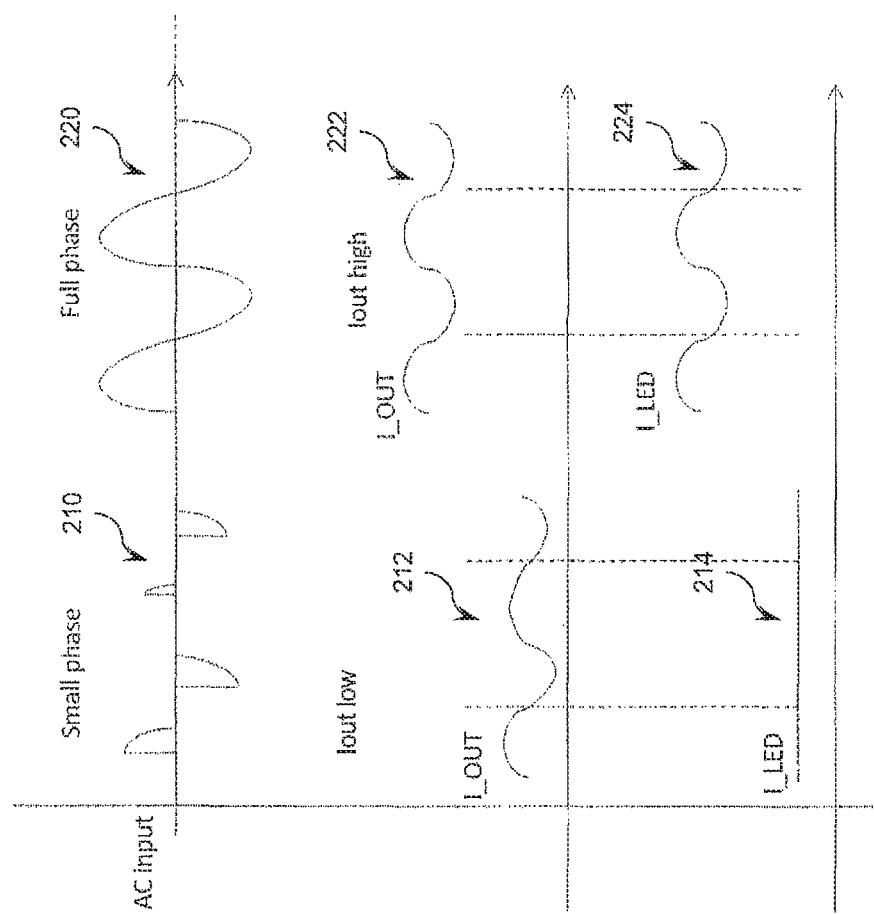
FIG. 2A and FIG. 2B show waveforms illustrating operation of a system for high efficiency flicker attenuation for LED lighting in accordance with an aspect of the disclosure.

When the average level of the LED current I_LED is low, the impedance of Q1 is made high, increasing the RC time constant of the low pass filter (Cout-LED1-Q1) such that Cout and the resistance of Q1 provide more low pass filtering to reduce flicker and shimmer resulting from the LED current. An example is shown in FIG. 2A. A user wishes to dim the lighting to a low level. The user turns the light down using a phase cut dimmer that cuts the phase of the AC mains input to a small phase AC input 210 to drive LED switch driver 102. LED switch driver 102 provides a correspondingly low level (Iout low) of output current (Iout in FIG. 1) shown as I_OUT 212 in FIG. 2A. The large impedance of Q1 (combined with filter capacitor Cout) has the effect of filtering out the variation in I_OUT 212 to provide a smooth LED current I_LED 214 at a low load level. Alternatively, it may be understood that the operation of Q1 in linear mode causes flicker resisting transistor Q1 to act like a resistor with respect to current I_LED and a drain voltage vd for flicker resisting transistor Q1 so that an increase in current I_LED produces a greater voltage drop across Q1 tending to resist the increase in current and vice versa for a decrease in I_LED. Either way, fluctuations in current are smoothed out as shown by low level I_LED current 214.

Conversely, when the average level of the LED current I_LED is high, the impedance of Q1 is made low, so that more of the power of the LED current can be used by LED1 with less being wasted by Q1. An example is shown in FIG. 2B. The user now wishes to raise (undim) the lighting to a high level. The user turns the light up using the phase cut dimmer that does not cut the phase of the AC mains input so as to provide full phase AC input 220 to LED switch driver 102. LED switch driver 102 provides a correspondingly high level (Iout high) of output current shown as I_OUT 222 in FIG. 2B. The small impedance of Q1 at saturation has the effect of providing the maximum available current to LED1 shown as LED current I_LED 224 at a high load level. The maximum available current is provided by not wasting energy on flicker reduction that is needed less at full power for high load.

Hence, system 100 provides an advantage in efficiency so that power is not wasted providing flicker reduction when it is not needed at high load/high current levels, while more application of flicker reduction is provided as the load or current level decreases where flicker is more noticeable and flicker reduction is needed more.

Figure 3:
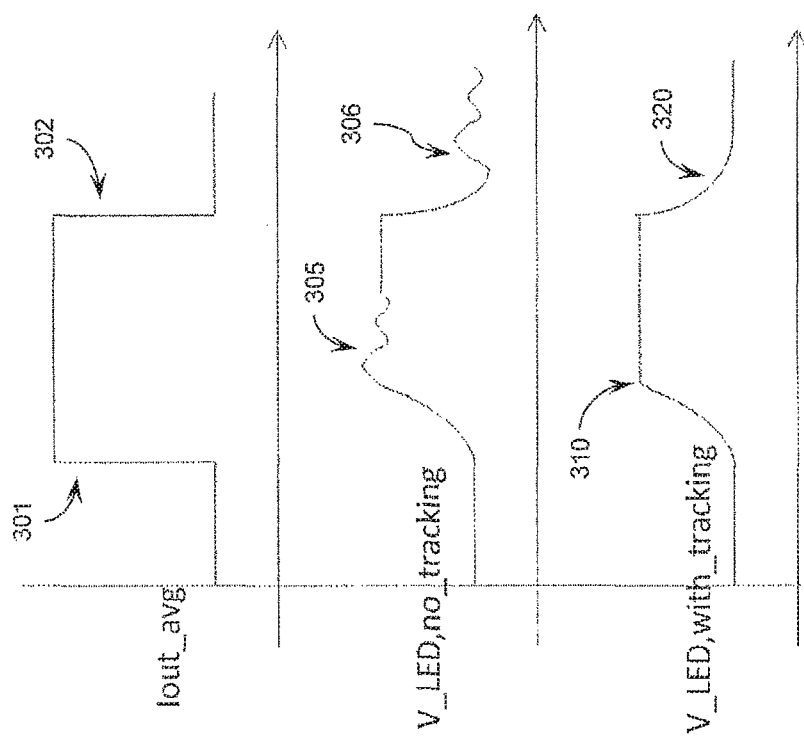
FIG. 3 shows waveforms comparing operation of an embodiment of a system for high efficiency flicker attenuation for LED lighting with conventional operation of LED lighting.

Referring again to FIG. 1, system 100 includes controller 110 coupled to the gate of Q1 to adjust the operating mode of Q1 by providing gate voltage vg. Controller 110 may have a terminal connected to ground (gnd). A resistor R0 connects between the output of diode D1 to a power supply input for controller 110 to provide a power supply voltage Vcc to controller 110. Controller 110 is also connected to the drain of Q1 to receive the drain voltage Vd. Controller 110 can sense the LED current I_LED or the drain current of Q1 using the drain voltage vd. Controller 110 can use the sensed current and the voltage vd to adjust the gate voltage vg to adjust the impedance of Q1 according to whether the LED current is high or low. When the LED current is high, controller 110 adjusts the impedance of Q1 to be low for better power efficiency. When the LED current is low, controller 110 adjusts the impedance of Q1 to be high for better flicker reduction. A capacitor C1 is connected between the gate of flicker resisting MOSFET Q1 and ground. Capacitor C1 provides a low pass filter for the gate voltage vg to smooth operation of flicker resisting MOSFET Q1. The low pass filtering of vg provided by capacitor C1 also improves tracking of the output voltage supplied to LED1 during transitions of the output current from high to low and low to high as illustrated in FIG. 3. Such transitions of the output current occur in response to a change in the input when the phase cut dimming is changed from low to high or vice versa.

For example, during a transition 301 of average Iout from low to high—such as may occur on a transition of small phase AC input 210 to full phase AC input 220—filtering of gate voltage vg by capacitor C1 during the transition from linear mode operation to saturation mode operation of flicker reducing transistor Q1 helps to provide a smooth transition 310 of the LED voltage in response to the sudden transition 301. (The output LED voltage may be determined from FIG. 1 as Vout-vd.) Without the filtering of capacitor C1 the transition of the LED voltage in response to the sudden transition 301 is prone to "ringing" or overshoot 305. Such overshoot can be perceived as "flash" when a user wishes to change the dimming level of the light quickly from low to high. Similarly during a transition 302 from high to low average Iout—such as may occur on a transition of full phase AC input 220 to small phase AC input 210—filtering of gate voltage vg by capacitor C1 during the transition from saturation mode operation to linear mode operation of flicker reducing transistor Q1 helps to provide a smooth transition 320 of the LED voltage in response to the sudden transition 302. Without the filtering of capacitor C1 the transition of the LED voltage in response to the sudden transition 302 is prone to undershoot 306 which can also be described as a "ringing" of the output voltage. Such undershoot also can be perceived as a residual flickering or "flash" when a user wishes to change the dimming level of the light quickly from high to low. The smooth output tracking of input changes enabled by the disclosed embodiments thus provide an additional advantage over conventional flicker or ripple reduction circuits or LED driver circuits that exhibit such flashing or flicker in response to sudden changes of the dimming level.

Figure 4:
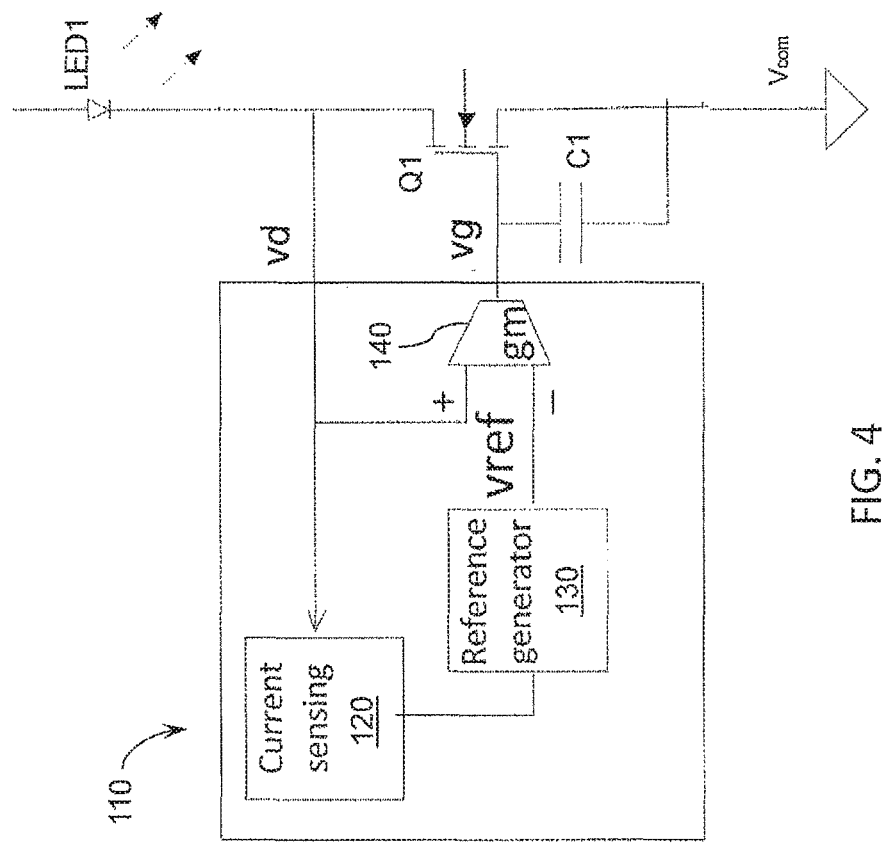
FIG. 4 is a circuit diagram of one embodiment of a system for high efficiency flicker attenuation for LED lighting in accordance with an aspect of the disclosure.

An example of controller 110 of system 100 for high efficiency flicker attenuation for LED lighting is shown in FIG. 4. In some embodiments, controller 110 may be implemented as a 4-pin integrated circuit (IC) device. But note that certain components such as an integrating capacitor for the current sensing module 120 may not be integrated within such an integrated circuit in some embodiments. For clarity, FIG. 4 does not show power supply and ground terminals as seen in FIG. 1. Controller 110 may be connected to an LED (LED1) and to the drain of a flicker resisting MOSFET (Q1) to provide drain voltage vd to current sensing circuit 120. In one embodiment to sense the drain current of Q1 (which is also the LED output current I_LED) current sensing circuit 120 may include a current sensing duplicate MOSFET of a smaller size than the flicker resisting MOSFET Q1. The current sensing duplicate MOSFET then has both the drain voltage vd and gate voltage vg parameters of Q1 from the vd and vg terminals and can use the drain voltage vd, the gate voltage vg and the size ratio of the duplicate MOSFET to the flicker resisting MOSFET to provide reference generator 130 with an input that approximates or is proportional to the drain current of Q1. Note that such an instantaneous sensing of the drain current of Q1 may be averaged over a fairly long time constant such as several hundred milliseconds or even seconds to average out the effect of ripple from the AC mains. Also, a current sense resistor could be used with the duplicate MOSFET to provide a voltage proportional to the sensed current to reference generator 130. Reference generator 130 provides a reference voltage vref that varies inversely with the sensed drain current. Reference generator 130 may be implemented, for example, by an inverter or an inverting amplifier designed to have an appropriate gain. The reference voltage vref may be provided to the negative input of transconductance amplifier 140.

Based upon the difference between the drain voltage and the reference voltage, transconductance amplifier 140 generates an output current to either charge or discharge capacitor C1 that connects between the gate of MOSFET Q1 and ground. The resulting charging or discharging of capacitor C1 thus regulates the gate voltage Vg for MOSFET Q1. So for example when the LED output current (Q1 drain current) is high, vref will be low, and vg will be raised to place Q1 in saturation mode or lower the impedance of Q1, as described above. Conversely, when the LED output current (Q1 drain current) is low, vref will be higher, and vg will be lowered to place Q1 in linear mode or raise the impedance of Q1, as described above. Capacitor C1 may also provide low pass filtering or smoothing of levels depending on the output current level. Capacitor C1 thus operates to smooth transitions of the output current flowing through Q1 in response to changes and transitions in the input dimming level as described above.

Figure 5:
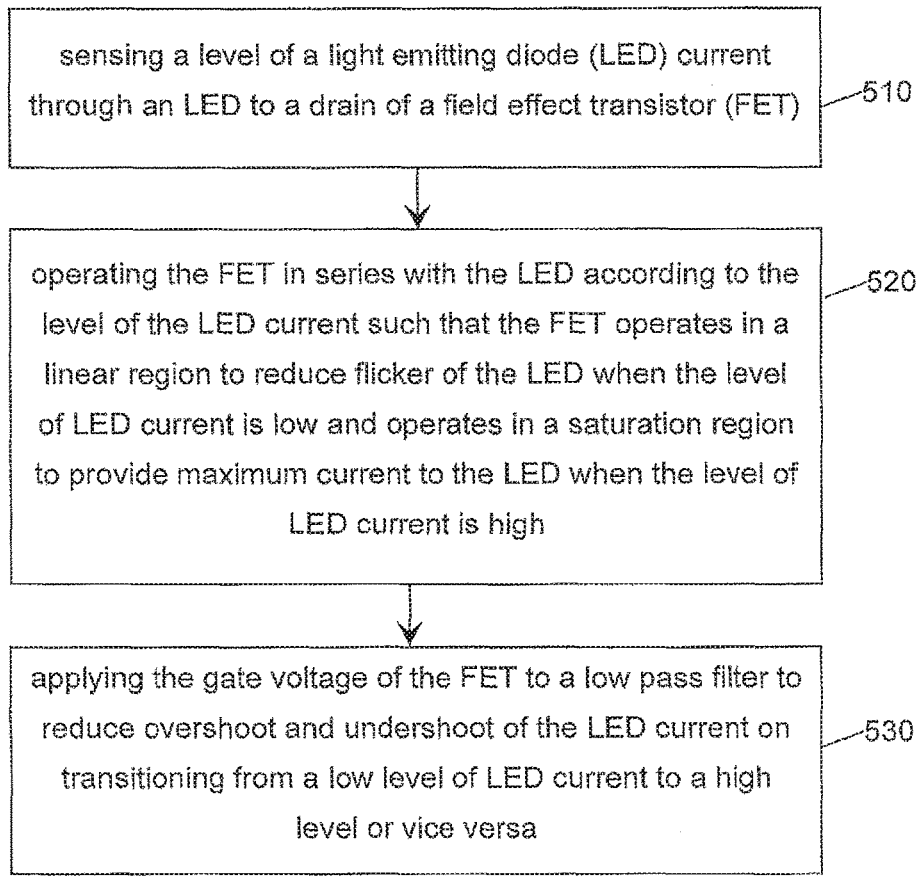
FIG. 5 is a flowchart for an example method of operation in accordance with an aspect of the disclosure.

A method of operation of system 100 will now be discussed with reference to the flowchart shown in FIG. 5. The method begins with an act 510 of sensing a level of a light emitting diode (LED) current through an LED to a drain of a field effect transistor (FET). Sensing the drain current of flicker resisting MOSFET Q1 (the LED output current I_LED) with current sensing circuit 120 using a current sensing duplicate MOSFET of a smaller size than the flicker resisting MOSFET Q1 is an example of act 510.

The method also includes an act 520 of operating the FET in series with the LED according to the level of the LED current such that the FET operates in a linear region to reduce flicker of the LED when the level of LED current is low and operates in a saturation region to provide maximum current to the LED when the level of LED current is high. Operating flicker resisting MOSFET Q1 so that when the LED output current (Q1 drain current) is high, the gate voltage vg will be raised to place Q1 in saturation mode or lower the impedance of Q1 and conversely, when the LED output current (Q1 drain current) is low, the gate voltage vg will be lowered to place Q1 in linear mode (ohmic mode) to raise the impedance of Q1 is an example of act 520.

The method also includes an act 530 of applying the gate voltage of the FET to a low pass filter to reduce overshoot and undershoot of the LED current on transitioning from a low level of LED current to a high level or vice versa. Providing capacitor C1 connected between the gate of flicker resisting MOSFET Q1 and ground such that capacitor C1 provides a low pass filter for the gate voltage vg to smooth operation of flicker resisting MOSFET Q1 is an example of act 530.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. An electronic circuit, comprising:
    a flicker resisting metal oxide semiconductor field effect transistor (MOSFET) in series with a light emitting diode (LED);
    a current sensing circuit adapted to sense a current conducted by the LED; and
    a controller coupled to the flicker resisting MOSFET, wherein the controller is configured to:
    sense a level of the current conducted through the LED; and
    operate the flicker resisting MOSFET in linear mode at a lower level of the current conducted by the LED and to operate the flicker resisting MOSFET in saturation mode at a higher level of the current conducted by the LED, wherein the controller includes a reference voltage generator coupled to the current sensing element and configured to provide a reference voltage that varies inversely with the sensed drain current.

2. The electronic circuit of claim 1, wherein the current sensing circuit is a reduced size duplicate of the flicker resisting MOSFET.

3. The electronic circuit of claim 2, wherein the current sensing circuit further comprises a current sense resistor coupled to the reduced size duplicate of the flicker resisting MOSFET.

4. The electronic circuit of claim 1, further comprising a transconductance amplifier configured to compare the reference voltage to a drain voltage of the flicker resisting MOSFET to form an output current coupled to the gate of the flicker resisting MOSFET.

5. The electronic circuit of claim 4, further comprising a filter capacitor connected between the gate of the flicker resisting MOSFET and ground.

6. The electronic circuit of claim 1, wherein the controller is further configured to average the current conducted by the LED.

7. The electronic circuit of claim 5, wherein the filter capacitor is configured to low pass filter the output current of the transconductance amplifier to reduce fluctuation of a gate voltage of the flicker resisting MOSFET.

8. A method comprising:
sensing a level of a light emitting diode (LED) current through an LED at a drain of a field effect transistor (FET); and
operating the FET in series with the LED according to the level of the LED current such that the FET operates in a linear region to reduce flicker of the LED when the level of LED current is low and operates in a saturation region to provide maximum current to the LED when the level of LED current is high, wherein operating the FET in a linear region comprises setting a gate voltage for the FET according to the sensed level of LED current, and wherein the gate voltage is applied to a low pass filter to reduce undershoot of the LED current on transitioning from a high level of LED current to a low level.

9. The method of claim 8, wherein operating the FET in the saturation region comprises setting a gate voltage for the FET according to the sensed level of LED current.

10. The method of claim 9, wherein the gate voltage is applied to a low pass filter to reduce overshoot of the LED current on transitioning from a low level of LED current to a high level.

11. The method of claim 10, wherein the low pass filter comprises a filter capacitor connected to the gate of the FET.

12. The method of claim 8, further comprising providing a reference voltage that varies inversely with the level of the sensed LED current.

13. The method of claim 12, wherein operating the FET in the linear region comprises setting a gate voltage for the FET based on a difference between a drain voltage of the FET and the reference voltage.

14. The method of claim 8, wherein the FET is a metal oxide semiconductor field effect transistor (MOSFET).

15. A controller, comprising:
a current sensing circuit configured to sense a drain current of a metal oxide semiconductor field effect transistor (MOSFET);
a reference generator circuit configured to provide a reference voltage that varies inversely with the sensed drain current; and
a transconductance amplifier configured to drive an output current into a capacitor coupled to the gate of the MOSFET based on a difference between a drain voltage of the FET and the reference voltage to operate the MOSFET in a linear region when the sensed drain current is low and in a saturation region when the sensed current is high.

* * * * *